United States Patent [19]

Formenti

[11] Patent Number: 5,531,077
[45] Date of Patent: Jul. 2, 1996

[54] REFRIGERATING SYSTEM WITH AUXILIARY COMPRESSOR-COOLING DEVICE

[75] Inventor: Franco Formenti, Verano Brianza, Italy

[73] Assignee: Veco S.R.L., Giussano, Italy

[21] Appl. No.: 337,419

[22] Filed: Nov. 7, 1994

[30] Foreign Application Priority Data

Nov. 5, 1993 [IT] Italy ................. MI93A2361

[51] Int. Cl.⁶ .................................................. F25B 41/04
[52] U.S. Cl. ............................................ 62/197; 62/228.3
[58] Field of Search ............................. 62/197, 228.3

[56] References Cited

U.S. PATENT DOCUMENTS

| | | | |
|---|---|---|---|
| 2,911,798 | 11/1959 | Gould | 62/180 |
| 4,300,357 | 11/1981 | Jacyno | 62/239 |
| 4,463,576 | 8/1984 | Burnett et al. | 62/228.3 |
| 5,251,453 | 10/1993 | Stanke et al. | 62/126 |

FOREIGN PATENT DOCUMENTS

| | | |
|---|---|---|
| 2101286 | 1/1983 | United Kingdom . |
| 2223299 | 4/1990 | United Kingdom . |
| 2254135 | 9/1992 | United Kingdom . |

*Primary Examiner*—William E. Tapolcai
*Attorney, Agent, or Firm*—Young & Thompson

[57] ABSTRACT

A refrigerating system in which a refrigeration fluid medium is flowing in a closed circuit comprising a compressor, a condenser, a receiver for containing the refrigeration fluid in a liquid state, and an evaporator serially connected between the outlet side and the intake side of the compressor; the improvement consisting in a cooling device for the compressor, comprising an auxiliary flow path for circulation of the refrigeration fluid, branched-off between the fluid receiver and the intake-side of the compressor and provided with a flow restrictor. Pressure sensing elements are provided on the intake side to provide a control signal in the absence of liquefied fluid in the receiver.

3 Claims, 3 Drawing Sheets

REFRIGERATING SYSTEM WITH AUXILIARY COMPRESSOR-COOLING DEVICE

TECHNICAL FIELD

The present invention relates to a refrigerating system particularly but not exclusively suitable for air conditioning of cars, vehicles, boats and similar applications in which the refrigerating system is usually subjected to vibrations and mechanical stresses which could cause the failure of the system, by losses of gas or preventing the circulation of the refrigeration medium, and consequently the overheating of the refrigeration compressor.

BACKGROUND OF THE INVENTION

Refrigeration systems for cars air conditioning usually comprise a compressor, a condenser, a receiver for containing a liquefied refrigeration fluid, and an evaporator serially connected to each other and between the outlet side and the intake side of the same refrigeration compressor, as well as control means to avoid compressor overheating.

The presently existing control systems for avoiding the overheating of refrigeration compressors, usually comprise thermostatically actuated safety devices for sensing the temperature of the compressor allowing the circulation of a flow of refrigerant for cooling the compressor. According to the operation mode, at a preset temperature the thermostatic control device starts allowing a flow of refrigerant from the fluid receiver to the intake side of the compressor to avoid overheating; nevertheless a thermostatic control system does not save the compressor from overheating as soon as a leakage of gas in the refrigeration circuit will not allow the liquefied refrigerant in the receiver to be sufficiently fed to the compressor and to the same thermostatic control device. In this event, the compressor will be no longer cooled and overheating will start. Because of that, the thermostatic control device totally opens and a flow of refrigerant in gas state will not cools the compressor which therefore will break-down. For this reason of for cost reasons, the thermally controlled safety devices and similar devices electronically controlled devices, are complex all involving relevant costs and are not used in economical refrigerating systems such as in air conditioning of cars, vehicles, boats and the like.

SUMMARY OF THE INVENTION

Therefore, a scope of the present invention is to provide a refrigerating system for cars, boats and the like, which prevents overheating of the compressor, allowing the circulation of a metered quantity of liquid refrigerant preventing overheating of the compressor should a leakage of fluid or a failure of the refrigeration circuit occur.

A further scope of the present invention is to provide a refrigerating system as stated above which is more reliable in operation and cheaper to manufacture.

According to the invention, a simple and reliable safety device for preventing overheating of the compressor in a refrigerating system has been provided. According to the invention, a refrigerating system suitable for air conditioning and the like has been provided, in which a refrigeration fluid medium, or liquefied refrigerant, is recirculated in a closed circuit provided with a compressor, a condenser, a receiver for containing the liquefied refrigerant, and an evaporator which are serially connected to each other and between the outlet side and the intake side of the compressor, and a compressor cooling device to prevent overheating, said compressor cooling device comprising an auxiliary flow path for the refrigerant, branched-off between said fluid receiver and the intake side of the compressor, flow restrictor means in said branched-off path defining a flow passage having a constant flow sectional area, and first pressure sensing means in said branched-off path operatively connected to the intake-side of the compressor to provide a control signal when liquefied fluid is lacking in said refrigeration fluid receiver.

BRIEF DESCRIPTION OF THE DRAWINGS

The invention and some preferred embodiments, will be now described hereunder in detail, making reference to the drawings, in which.

DETAILED DESCRIPTION OF THE INVENTION

Figure 1:
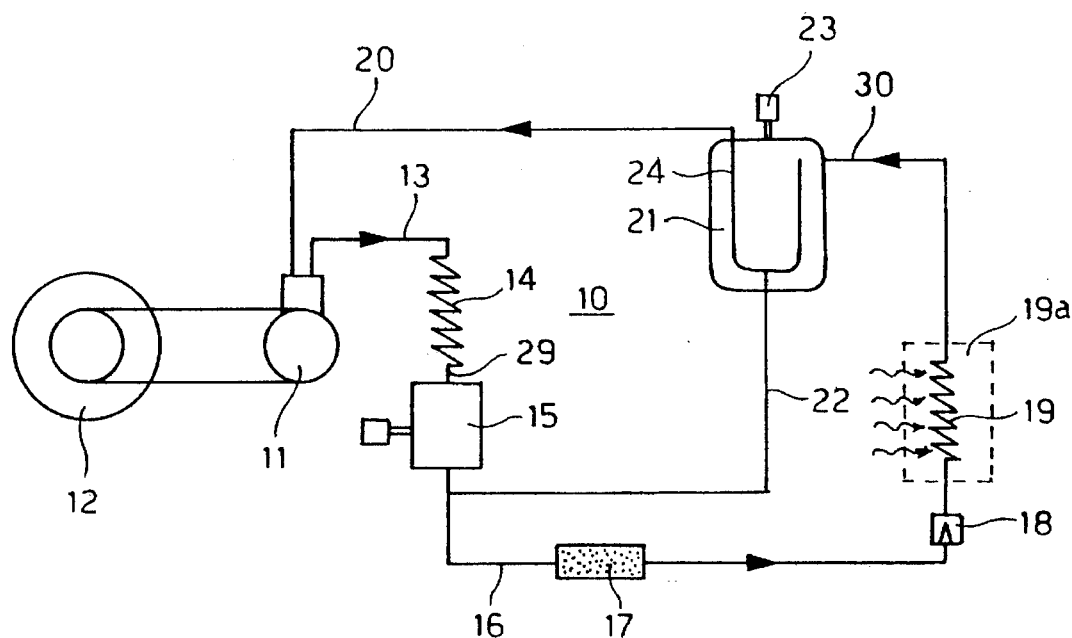
FIG. 1 shows a first embodiment of a refrigerating system comprising an auxiliary cooling device according to the invention.

In FIG. 1, reference 10 denotes a first embodiment of a refrigerating system according to the invention, comprising a refrigeration compressor 11 suitably operated by a drive motor 12 or by the engine of a vehicle on which the refrigerating system is provided. The outlet side 13 of the compressor 11 is serially connected to a condenser 14 consisting of a heat exchanger for condensing the pressurised refrigerant. The liquefied refrigerant from the condenser 14 is collected in a receiver 15 from which is fed and made flow through a feeding line 16, a dryer 17 and a first control valve 18, to an evaporator 19 inside a conditioner 19a connected to the intake line 20 of the compressor 11, for example by a suction accumulator 21, as shown.

According to the present invention, the refrigerating system is provided with an auxiliary cooling device for the compressor, allowing a safety circulation of a small flow of refrigerant under pressure controlled conditions along a branched-off path, to avoid overheating of the compressor in the case a failure of the refrigeration circuit or a leakage of refrigerant should occur. In general term, the compressor cooling device is provided with a branched-off path 22 comprising a flow restrictor defining a flow passage having a restricted cross-sectional area, for example in the form of a capillary pipe and/or a throttling valve, to circulate the liquid refrigerant from the receiver 15 to the intake side 20 of the compressor. The auxiliary cooling device furthermore comprises first pressure sensing means 23, such as pressure actuated switch to sense the pressure at the intake side 20 of the compressor, providing an electric control signal when a significant pressure drop will occur in the compressor suction side, to stop the same compressor or to alert in absence of liquid refrigerant in the receiver 15.

More precisely, the embodiment of FIG. 1 comprises a capillary pipe 22 having a diameter and length adequate to the capacity and to the cooling requirements of the compressor 11, in which said capillary pipe 22 protrudes inside the suction accumulator 21, being connected to the bottom of an U-shaped suction pipe 24 inside the same suction accumulator 21. In the present case, as shown in FIG. 1, the pressure switch 23 is sensing the pressure directly inside the accumulator container 21, although said pressure switch 23 could be differently positioned in the auxiliary cooling circuit, to sense a first threshold pressure P1 at the intake side of compressor 11, which is substantially lower than the working pressure P2 at the same suction side during normal running of the compressor.

The working of the refrigerator circuit and of the auxiliary cooling device of FIG. 1, will be shortly explained hereunder: during the normal running of the compressor, a sufficient flow of liquid refrigerant is circulated from the receiver 15 to the evaporator 19, to the accumulator 21 and to the intake side 20 of the compressor, to allow the refrigeration of a flow of air forced through the evaporator inside the air-conditioner 19a, and for cooling the compressor 11.

During normal working of the refrigerating system 10, the pressure value inside the accumulator 21 on the suction side, is higher than the pressure value at which the pressure switch 23 is actuated. Furthermore, a small flow of refrigerant is continuously fed through the capillary pipe 22 of the auxiliary cooling circuit without affecting the efficiency of the refrigerating system.

Should the control valve 18 be blocked, preventing circulation of the refrigerant, or a refrigerant leakage should occur, the sucking action of running compressor 11 will suck a metered quantity of liquid refrigerant from the bottom of the receiver 15 through the branched-off circuit of the auxiliary cooling device, allowing the compressor 11 to be fed with a flow of fluid refrigerant sufficient to keep the same compressor cooled at an appropriate temperature, avoiding overheating for a long period of time, and until liquid refrigerant will exist in the bottom of the receiver 15.

When the refrigerant in a liquid state will no longer be present in the receiver 15 because of a leak and the very high pressure drop caused by the flow of refrigerant in gas state through the capillary pipe, the pressure in the accumulator 21 or at the intake side of the compressor will rapidly decrease under the threshold pressure value of the pressure switch 23 which will provide a control signal to stop the compressor 10, or to alert.

Figure 2:
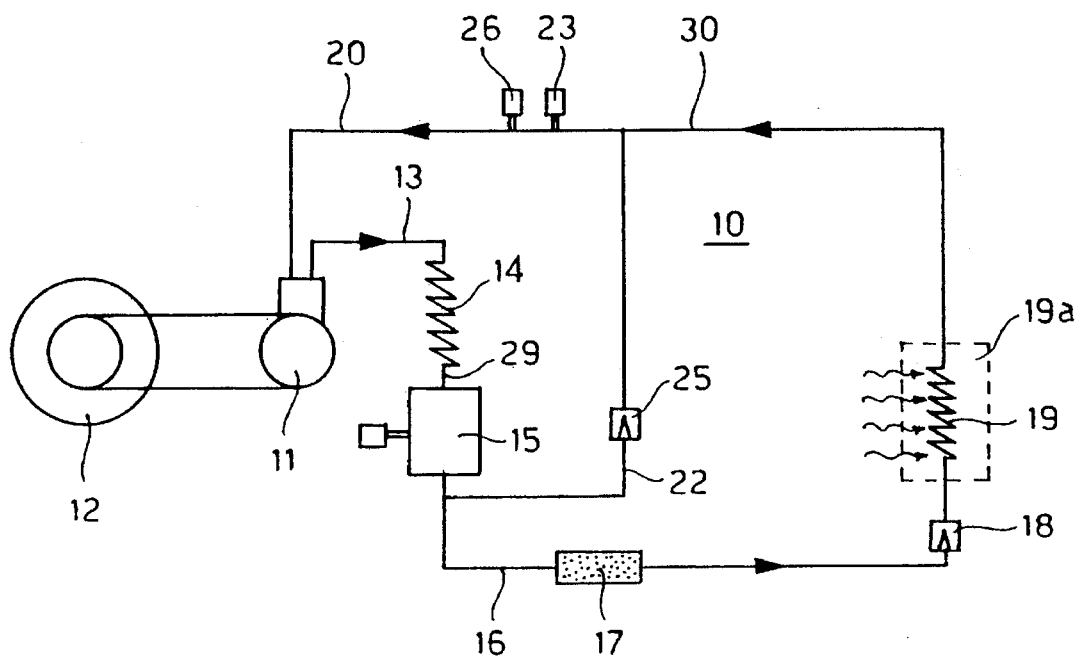
FIG. 2 shows a second embodiment of the refrigerating system according to the invention.

FIG. 2 of the drawings relates to a second embodiment for the auxiliary cooling device according to present invention. In FIG. 2, all unchanged parts in respect to FIG. 1, have been shown by the same reference numbers; therefore the auxiliary cooling device again comprises a branched-off path 22 consisting of a capillary pipe and a throttling valve 25, in the form of a normally closed solenoid valve, which may be actuated by a second pressure switch 26 sensing a second threshold pressure value P3 at the intake side 20 of the compressor, which is higher than the threshold value P1 of the first pressure switch 26 and preferably comprised between the latter and the suction pressure P3 of the compressor under normal running. Therefore, should a failure suddenly occur, blocking the circulation of refrigerant to the evaporator 19 and to the compressor, the pressure at the intake side 20 sensed by the pressure switch 26 will be reduced at the threshold value P3; therefore the pressure switch 26 will generate a control signal to actuate or open the throttling valve 25 allowing circulation of a sufficient amount of liquid refrigerant from the receiver 15 to keep the compressor 11 cooled. When the liquid refrigerant in the receiver 15 has been completely fed to the compressor, and the receiver 15 is empty causing circulation of the refrigerant in gas state, the pressure at the intake side 20 will again drop under the threshold pressure stopping the compressor or providing an alert signal for the user.

Figure 3:
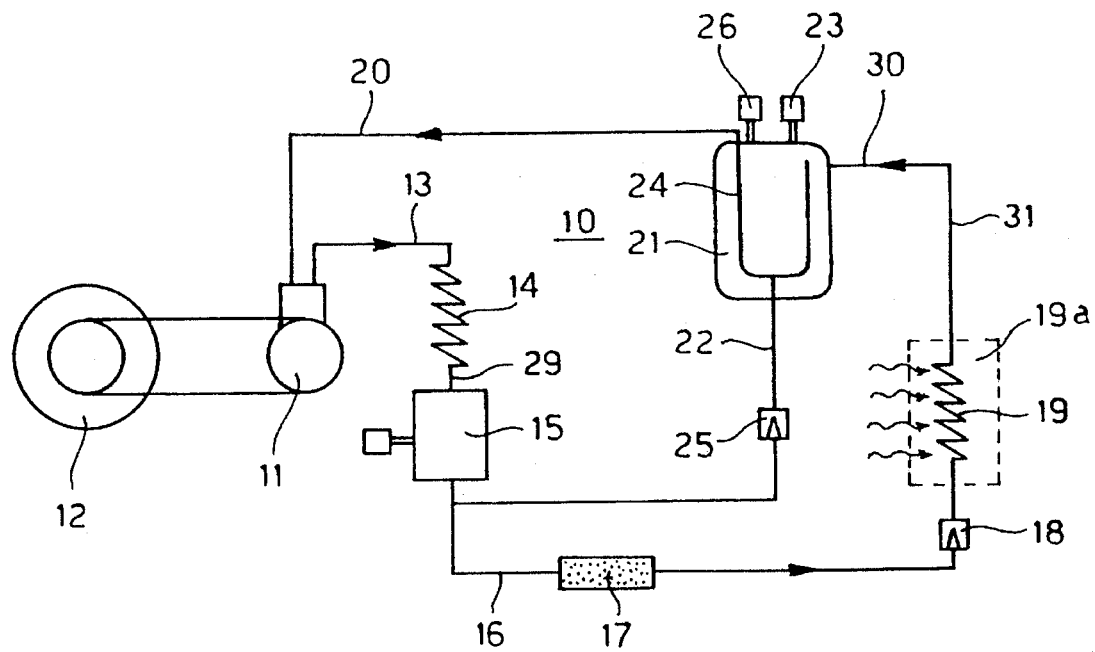
FIG. 3 shows a third embodiment comprising the combination of the systems of previous FIGS. 1 and 2.

FIG. 3 of the drawings shows a third embodiment of the invention which provides a higher degree of safety. The embodiment of FIG. 3 is a combination of the auxiliary cooling devices of FIGS. 1 and 2. Therefore the cooling device of FIG. 3 provides branched-off path comprising the capillary pipe 22, the throttling control valve 25, the refrigerant accumulator 21 and pressure switches 23 and 26.

Figure 4:
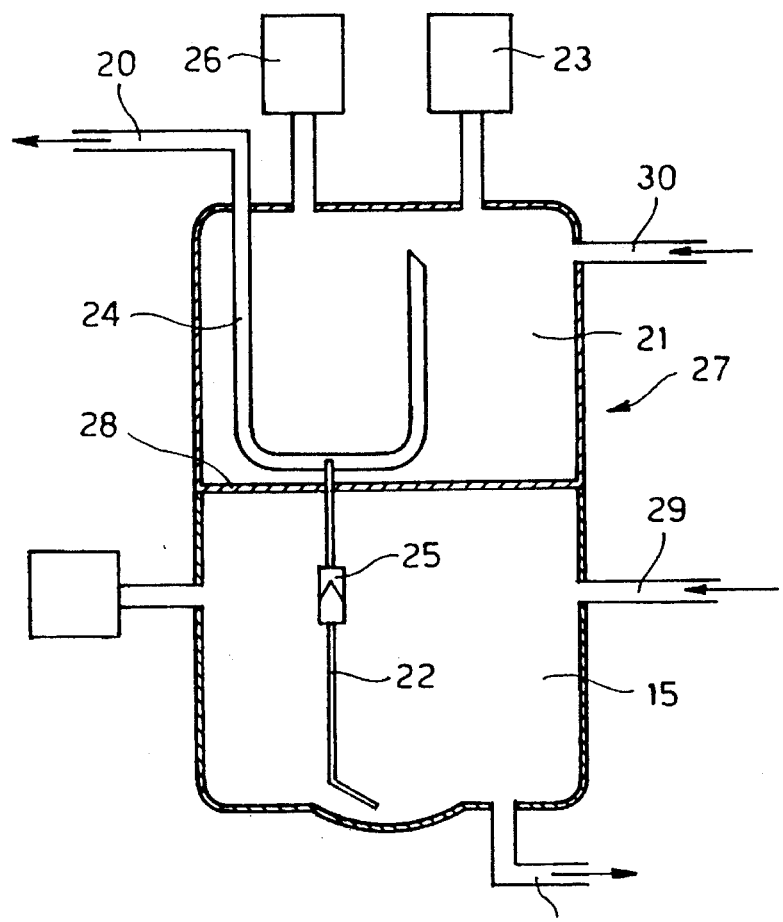
FIG. 4 shows an enlarged detail of FIGS. 1 and 3.

FIG. 4 of the drawings shows a particular embodiment of the cooling device of FIG. 3 in which the receiver 15 and the fluid accumulator 21 are combined in a single unit. According to FIG. 4, the device comprises a double container 27 divided by an intermediate wall or inner partition 28 in two superimposed chambers defining the receiver chamber 15 and the accumulator chamber 21. In FIG. 4, in FIG. 3, reference 29 indicates the inlet conduit and 16 the outlet conduit of the receiver 16, while 30 indicates the inlet conduit and 20 the outlet conduit of the accumulator 21. Furthermore references 22, 25, 24, 23 and 26 indicate the capillary pipe, the throttling valve, the suction tube and the pressure switches respectively, in which the capillary pipe 22 and the solenoid valve 25 are provided inside the receiver chamber 15.

Figure 5:
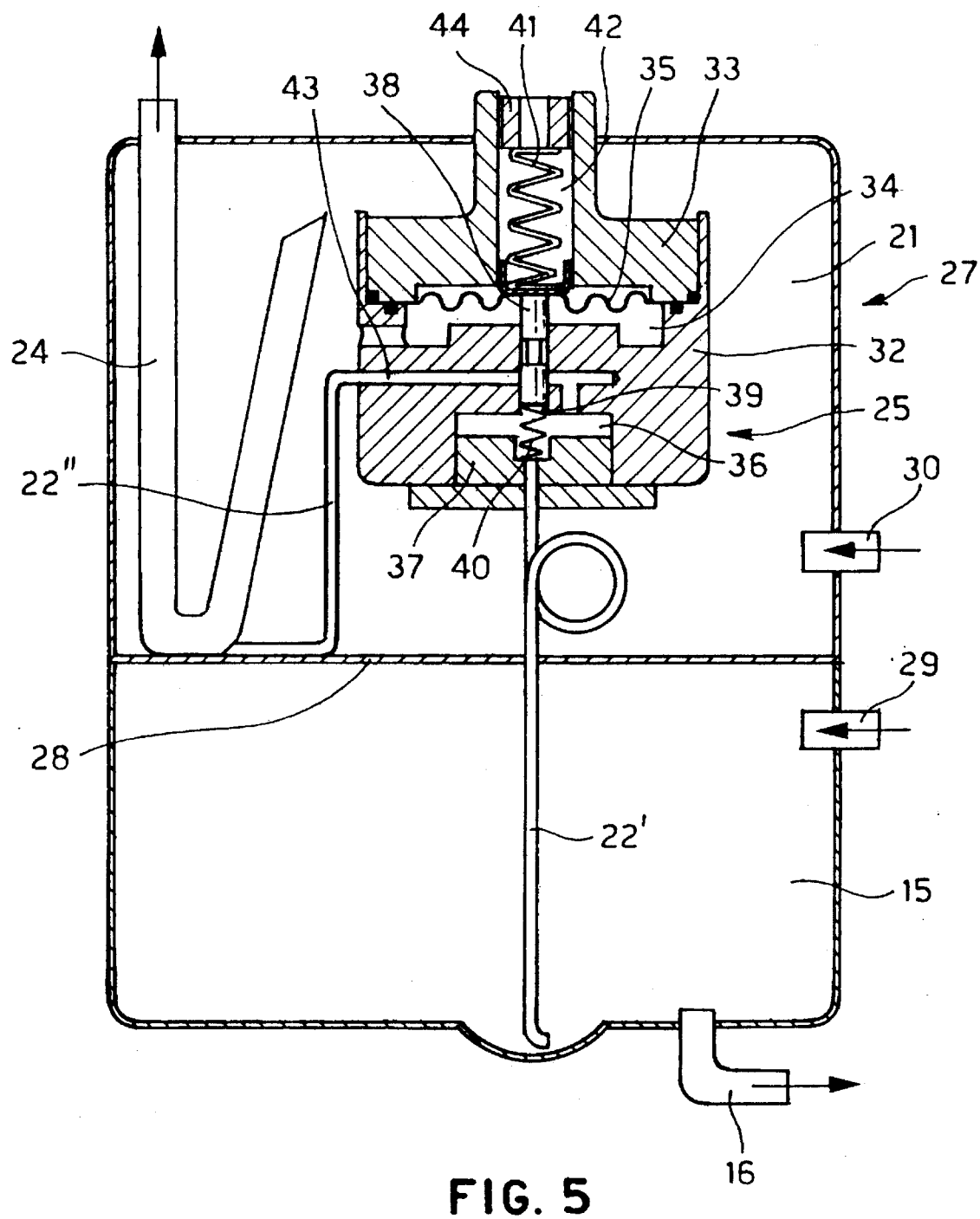
FIG. 5 shows a further embodiment of the auxiliary cooling device.

Lastly, FIG. 5 refers to a solution which make use of a pressure actuated throttling valve for the auxiliary cooling device. According to FIG. 5, the device again is in the form of a single unit 27 comprising a double container divided by an intermediate partition 28 into a bottom chamber defining the receiver chamber 15, and in an upper chamber defining the accumulator chamber 21. A pressure actuated throttling valve 25 is provided inside the accumulator chamber and is connected by a capillary pipe 22', with the bottom of the receiver chamber 15, and by a second capillary pipe 22" is connected to the U-shaped suction tube 24 inside the chamber 21.

More precisely, the valve 25 comprises a hollow body portion 32 and a cover member 33 defining a chamber 34 closed by a bellow or elastically yielding membrane 35 sealingly retained between opposite annular seatings of the body 32 and the cover 33.

The body portion 32 comprises at the bottom side, a cavity 36 in which a plug 37 in sealingly screwed or brazed to connect the cavity 36 directly with the capillary pipe 22' and indirectly with the capillary pipe 22" via a valving device. The valving device comprises valve member 38 slidingly movable in an axial bore 39 of the body, between an advanced and a retracted position under the balancing actions of opposite spring members 40, 41 in the cavity 36, respectively in an central bore 42 of the cover member 33, as well as under the pressure in the valve chamber 34. The bore 39 opens towards the cavity 36 and the chamber 34 respectively, under the membrane 35, while the bore 42 in the cover member opens towards the atmosphere and respectively in the chamber 21.

The cavity 36 of the valve 25, on one side is in communication with the capillary pipe 22" by a cross hole 43 which may be closed or open by the valve member 38, in said retracted and advanced positions, to prevent or respectively to allow the circulation of refrigerant along the auxiliary cooling circuit for the compressor.

As stated above, the upper side of the membrane 35 is connected via the hole 42 to the atmosphere, while the bottom side of the membrane 35 is connectable, via hole 43, the valve member 38 and the suction tube 24 to the intake of the compressor. The membrane 35 usually will stay in the position shown in FIG. 5, in which valve member 38 close the hole 43 under the balancing action of the forces of springs 40, 41 and suction force into the chamber 34, on opposite sides of the same membrane 35. The load of the spring 42 on the membrane 35 my be varied and adjusted by a screwed plug member 44 in the bore 42. Therefore, when the suction force at the bottom side of the membrane becomes below a pre-established value, the membrane 35 under the prevailing force of the upper spring 41, will push down the needle or valve member 38 allowing a metered flow of refrigerant to circulate from the receiver chamber 15 to the suction side of the compressor, just enough to cool it down.

According to the present invention, the auxiliary path 22 for circulating the refrigerant necessary for cooling down the compressor, comprises a restricted flow path provided by a capillary pipe and/or by a throttling valve, to define a constant cross-sectional area for the flow. It is nevertheless evident that said throttling valve 25 and said capillary pipe of the branched-off path 22, may be differently provided or positioned, provided that they will allow a suitable circulation of refrigerant for cooling the compressor, avoiding short circuiting. Therefore, according to the invention, the capillary pipe may be any pipe or tube having a small diameter, for example comprised between 0,5 and 2 mm, and a length suitable to provide a pressure drop comparable to or higher than the pressure drop provided by the evaporator 19. Lastly, in the embodiments shown, the capillary pipe 22, 22" open directly into the suction tube 24 inside the fluid accumulator 21; nevertheless said capillary pipe may open directly in the accumulator chamber 21 to directly connect the latter with the bottom of the receiver chamber 15 of the device.

What is claimed is:

1. A refrigeration system for air conditioners, in which a liquefied refrigerant is circulated at an operative pressure in a closed refrigeration circuit comprising a compressor, a condenser, a receiver for collecting the liquefied refrigerant from the condenser, and an evaporator serially connected to each other; and an auxiliary cooling device for the compressor, said auxiliary cooling device comprising a branched-off path for circulation of liquefied refrigerant from the receiver to an intake of the compressor; flow control and pressure-actuated valve means being provided in said branched-off path, and first pressure sensing means at the intake side of the compressor to operate said flow control valve means and to allow circulation of liquefied refrigerant from said receiver to said compressor intake, said valve means and said first pressure sensing means comprise in combination:

a valve body having a valve chamber and a yielding membrane sealingly provided in said valve chamber between an upper and a bottom side; the upper side of said valve chamber being connected to the atmosphere while the bottom side of the valve chamber being connected to the compressor intake to provide said first pressure sensing means;

and a closed cavity in the valve body (32), said closed cavity being connected to the bottom of the receiver by a capillary pipe, respectively being connected to the intake side of the compressor by a flow path provided with said pressure-actuated flow-control valve means; a bore in the valve body axially extending between the bottom side of the valve chamber and said closed cavity, and a valve member slidingly movable in said axial bore between a retracted and an advanced position respectively to close and to open said flow path;

counteracting spring means being provided at opposite ends of the valve member, said spring means and said membrane conjointly acting on said valve member to open said flow path for circulating a metered flow of liquefied refrigerant from the receiver to the compressor intake when the sensed suction force in the bottom side of the valve chamber, drops below a preset pressure value lower than the operative pressure for the compressor.

2. A refrigeration system according to claim 1 comprising second pressure sensing means on the low-pressure side of said circuit, to provide stop and alerting signals at a second control pressure value lower than said operative pressure value of the compressor intake side, said pressure actuated valve means comprising a normally closed throttling valve in said branched-off path, said first pressure sensing means being operative to actuate said throttling valve at control pressure values comprised between said operative pressure value and said second control pressure value at the compressor intake side.

3. A refrigeration system for air conditioners, in which a liquefied refrigerant is circulated at an operative pressure in a closed refrigeration circuit comprising a compressor, a condenser, a receiver for collecting liquefied refrigerant from the condenser, an evaporator and a fluid accumulator serially connected to each other; and an auxiliary cooling device for the compressor, said auxiliary cooling device comprising a branched-off path for circulation of liquefied refrigerant between the receiver and the compressor intake; and a pressure-actuated flow control valve in said branched-off path, comprising pressure sensing means to sense pressure at an intake side of the compressor to operate said valve and allow circulation of liquefied refrigerant from said receiver to said compressor intake when the suction pressure of the compressor drops below the operative pressure value at the intake side, said receiver and said accumulator being comprised in a single container unit having superimposed fluid receiver and fluid accumulator chambers, and in which the bottom side of the fluid receiver chamber and the fluid accumulator chamber are connected by said pressure-actuated valve and a capillary tube inside said container unit.

\* \* \* \* \*